(12) United States Patent
Liu et al.

(10) Patent No.: US 11,837,912 B2
(45) Date of Patent: Dec. 5, 2023

(54) SWITCHING METHOD AND MULTI-INPUT POWER SYSTEM

(71) Applicant: Delta Electronics (Shanghai) Co., Ltd., Shanghai (CN)

(72) Inventors: Hongguang Liu, Shanghai (CN); Chuanhui Weng, Shanghai (CN); Xingkuan Guo, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/804,099

(22) Filed: May 26, 2022

(65) Prior Publication Data

US 2023/0006464 A1 Jan. 5, 2023

(30) Foreign Application Priority Data

Jul. 2, 2021 (CN) .......................... 202110753712.0

(51) Int. Cl.
*H02J 9/06* (2006.01)
*G06F 1/26* (2006.01)
*G06F 1/30* (2006.01)

(52) U.S. Cl.
CPC .............. *H02J 9/061* (2013.01); *G06F 1/263* (2013.01); *G06F 1/30* (2013.01); *H02J 9/068* (2020.01); *H02J 2300/10* (2020.01)

(58) Field of Classification Search
CPC .... H02J 9/061; H02J 9/06; H02J 9/068; H02J 9/066; H02J 9/08; G06F 1/26; G06F 1/30; G06F 1/263; H02H 9/001; H02H 9/005
See application file for complete search history.

(56) References Cited

U.S. PATENT DOCUMENTS

| | | | | |
|---|---|---|---|---|
| 9,484,771 B2* | 11/2016 | Braylovskiy | ........... | H02J 9/061 |
| 9,692,231 B2* | 6/2017 | Nguyen | ............... | H02J 9/06 |
| 2016/0043596 A1* | 2/2016 | Yamaguchi | ............. | H02J 9/061 |
| | | | | 307/29 |

FOREIGN PATENT DOCUMENTS

| | | |
|---|---|---|
| CN | 108963996 A | 12/2018 |
| CN | 109889030 A | 6/2019 |

* cited by examiner

*Primary Examiner* — Ryan Johnson
(74) *Attorney, Agent, or Firm* — CKC & Partners Co., LLC

(57) ABSTRACT

The embodiments of the present disclosure provide a switching method and a multi-input power system, where the method is used to control an input power source connected with N power supply units, and N is greater than 1, and the method includes: determining a switching strategy for each power supply unit, where the switching strategy is used to indicate a moment when input of a power supply unit is switched from an auxiliary input power source to a main input power source; switching, according to the switching strategy, the input of each power supply unit from the auxiliary input power source to the main input power source at the moment indicated by the switching strategy, where the main input power source includes a standby power source.

19 Claims, 7 Drawing Sheets

SWITCHING METHOD AND MULTI-INPUT POWER SYSTEM

CROSS-REFERENCE TO RELATED APPLICATION

This application claims priority to Chinese Patent Application No. 202110753712.0, filed on Jul. 2, 2021, which is hereby incorporated by reference in its entirety.

TECHNICAL FIELD

The present disclosure relates to the technical field of power supplying, and in particular, to a switching method and a multi-input power system.

BACKGROUND

High efficiency and reliability of a data center power supply system is the constant pursuit of the industry, and a dual-input power supply is increasingly used in the data center power supply system because of its high reliability.

The dual-input power system means that there are two kinds of power inputs, that is, as shown in FIG. 1, a main input power source and an auxiliary input power source both connected to the system to supply power to a load. When the main input power source fails, the power supply unit (PSU) of the system can be switched from the main input power source to the auxiliary input power source, and the auxiliary input power source supplies power to the system. However, the auxiliary input power source is usually a battery, which cannot supply power to the system for a long time. Therefore, the main input power source needs to include two power resources connected in parallel, which are a grid power source and a standby power source, thereby ensuring that the standby power source supplies power to the system when the power grid is cut off. The standby power source is usually sensitive to a change of the load.

Therefore, when switching from the auxiliary input power source to the main input power source, if the standby power source is used and when there is too much load connected instantaneously, a large instantaneous inrush current will be generated, which will cause output failure.

SUMMARY

The present application provides a switching method and a multi-input power system to solve the problem of output failure that will occur when a plurality of power supply units are simultaneously switched from an auxiliary input power source to a main input power source, and if a standby power source is used as the main input power source.

In a first aspect, the present application provides a switching method for switching N power supply units, where N is greater than 1, the method including:

determining a switching strategy for each power supply unit, where the switching strategy is used to indicate a moment when input of a power supply unit is switched from an auxiliary input power source to a main input power source; and switching, according to the switching strategy, the input of each power supply unit from the auxiliary input power source to the main input power source at the moment indicated by the switching strategy, where the main input power source includes a standby power source.

Optionally, switching, according to the switching strategy, the input of each power supply unit from the auxiliary input power source to the main input power source at the moment indicated by the switching strategy includes:

determining power supply units to be switched at different moments; and sending a control instruction to corresponding power supply units at the different moments, respectively, where the control instruction is used to open a switch between the power supply unit and the auxiliary input power source, and to close a switch between the power supply unit and the main input power source.

Optionally, determining a switching strategy for each power supply unit includes:

determining a switching sequence for each power supply unit; and determining a switching moment for each power supply unit, where a time interval between any two adjacent switching moments is equal to or is greater than a time period required to switch the input of the power supply unit from the auxiliary input power source to the main input power source.

Optionally, the method further includes:

reducing an output current of the power supply unit when the input of the power supply unit is switching from the auxiliary input power source to the main input power source.

Optionally, the power supply unit includes an AC/DC unit and a DC/DC unit, and the AC/DC unit and the DC/DC unit are connected through a capacitor, the method further including:

raising, when switching the input of the power supply unit from the auxiliary input power source to the main input power source, a voltage of the capacitor corresponding to the power supply unit.

Optionally, the method further includes:

detecting whether the main input power source is able to supply power; and performing, when it is detected that the main input power source is able to supply power, the step of determining the switching strategy for each power supply unit.

Optionally, the standby power source is a diesel generator.

In a second aspect, the present application provides a switching method applied to a multi-input power system, the multi-input power system including: a first power supply unit, a second power supply unit, a main input power source and an auxiliary input power source;

the first power supply unit is electrically coupled with the main input power source through a first switch, and is electrically coupled with the auxiliary input power source through a second switch; and the second power supply unit is electrically coupled with the main input power source through a third switch, and is electrically coupled with the auxiliary input power source through a fourth switch, the switching method including: switching, when the first power supply unit and the second power supply unit need to be switched from the auxiliary input power source to the main input power source, the first power supply unit and the second power supply unit from the auxiliary input power source to the main input power source at different moments, respectively, where the main input power source includes a standby power source.

Optionally, the switching the first power supply unit and the second power supply unit from the auxiliary input power source to the main input power source at different moments, respectively, includes:

switching, after the first power supply unit is switched from the auxiliary input power source to the main input power source, the second power supply unit from the auxiliary input power source to the main input power source.

Optionally, the method further includes:

reducing, when the first power supply unit starts to switch from the auxiliary input power to the main input power, an output current of the first power supply unit; and/or reducing, when the second power supply unit starts to switch from the auxiliary input power source to the main input power source, an output current of the second power supply unit second power supply unit.

Optionally, each of the first power supply unit and the second power supply unit includes an AC/DC unit and a DC/DC unit, and the AC/DC unit and the DC/DC unit are connected through a capacitor, the method further including:

raising, when the first power supply unit starts to switch from the auxiliary input power source to the main input power source, a voltage of the capacitor of the first power supply unit; and/or raising, when the second power supply unit starts to switch from the auxiliary input power source to the main input power source, a voltage of the capacitor of the second power supply unit.

Optionally, the switching the first power supply unit and the second power supply unit from the auxiliary input power source to the main input power source at different moments, respectively, includes:

when the first power supply unit is switched from the auxiliary input power source to the main input power source, opening the second switch, and closing the first switch; when the second power supply unit is switched from the auxiliary input power source to the main input power source, opening the fourth switch, and closing the third switch.

Optionally, the method further includes:

detecting whether the main input power is able to supply power; and performing, when it is detected that the main input power source is able to supply power, switching the first power supply unit and the second power supply unit from the auxiliary input power source to the main input power source at different moments.

Optionally, the standby power source is a diesel generator.

In a third aspect, the present application provides a multi-input power system, including: a first power supply unit, a second power supply unit, a main input power source and an auxiliary input power source;

the first power supply unit is electrically coupled with the main input power source through a first switch, and is electrically coupled with the auxiliary input power source through a second switch, where the main input power source includes a standby power source;

the second power supply unit is electrically coupled with the main input power source through a third switch, and is electrically coupled with the auxiliary input power source through a fourth switch; and when the first power supply unit and the second power supply unit need to be switched from the auxiliary input power source to the main input power source, the first power supply unit and the second power supply unit are switched from the auxiliary input power source to the main input power source at different moments, respectively.

Optionally, after the first power supply unit is switched from the auxiliary input power source to the main input power source, the second power supply unit is switched from the auxiliary input power source to the main input power source.

Optionally, when the first power supply unit starts to switch from the auxiliary input power source to the main input power source, an output current of the first power supply unit is controlled to reduce; and/or when the second power supply unit starts to switch from the auxiliary input power source to the main input power source, an output current of the second power supply unit is controlled to reduce.

Optionally, each of the first power supply unit and the second power supply unit includes an AC/DC unit and a DC/DC unit, and the AC/DC unit and the DC/DC unit are connected through a capacitor;

when the first power supply unit is switched from the auxiliary input power source to the main input power source, a voltage of the capacitor of the first power supply unit is controlled to increase; and/or, when the second power supply unit is switched from the auxiliary input power source to the main input power source, a voltage of the capacitor of the second power supply unit is controlled to increase.

Optionally, when the first power supply unit is switched from the auxiliary input power source to the main input power source, the second switch is opened, and the first switch is closed; and, when switching the second power supply unit from the auxiliary input power source to the main input power source, the fourth switch is opened, and the third switch is closed.

Optionally, the system further includes a detecting module;

the detecting module is configured to detect whether the main input power source is able to supply power, and when it is detected that the main input power source is able to supply power, the first power supply unit and the second power supply unit are switched from the auxiliary input power source to the main input power source at different moments, respectively.

The embodiments of the present application provide a switching method and a multi-input power system, and the method can determine a switching strategy corresponding to respective power supply units, where the switching strategy is used to indicate moments when inputs of the respective power supply units switch from an auxiliary input power source to a main input power source; switch, according to the switching strategy, the inputs of the respective power supply units from the auxiliary input power source to the main input power source at corresponding moments, respectively, where the main input power source includes a standby power source, and N is greater than 1. The method switches the inputs of different power supply units at different moments, achieving a reduction of an inrush current in switching from the auxiliary input power source to the main input power source, thereby reducing possibility of output failure.

BRIEF DESCRIPTION OF DRAWINGS

In order to explain the technical solution in the present application or the prior art more clearly, the drawings used in the description of the embodiments or the prior art will be briefly introduced below. Obviously, the drawings in the following description are some embodiments of the present application, and other drawings may be obtained according to these drawings without making creative efforts.

DESCRIPTION OF EMBODIMENTS

The technical solution in the embodiments of the present disclosure will be described clearly and completely with reference to the drawings in the embodiments of the present disclosure. Obviously, the described embodiments are only part of the embodiments of the present disclosure, not all of them. Based on the embodiments of the present disclosure, all other embodiments obtained by those of ordinary skills in the art without making creative efforts belong to the protection scope of the present disclosure.

The terms "first", "second", "third", "fourth", etc. (if any) in the specification and claims of the present disclosure and the above drawings are used to distinguish similar objects, and are not necessarily used to describe a specific order or sequence. It should be understood that the data used in such way may be interchanged under appropriate circumstances, so that the embodiments of the disclosure described herein can be, for example, implemented in an order other than those illustrated or described herein. In addition, the terms "including" and "having" and any variations thereof are intended to cover non-exclusive inclusion. For example, a process, a method, a system, a product or a device including a series of steps or units need not be limited to those steps or units explicitly listed, but may include other steps or units not explicitly listed or inherent to these processes, methods, products or devices.

Figure 1:
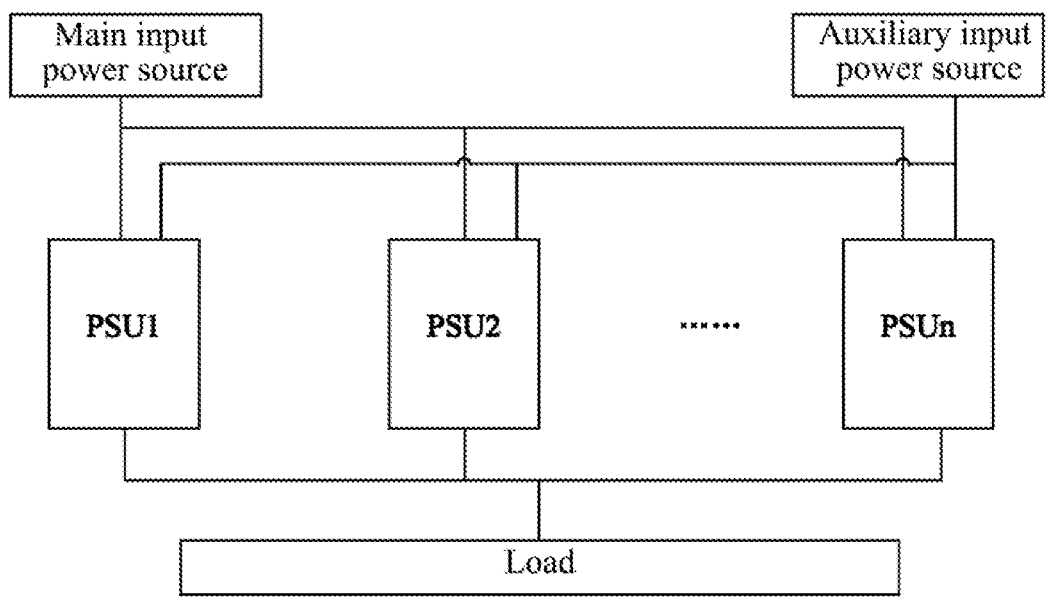
FIG. 1 is a structural diagram of a dual-input power system provided by an embodiment of the present disclosure.

FIG. 1 is a structural diagram of a dual-input power system provided by an embodiment of the present disclosure. As shown in FIG. 1, the dual-input power system includes two power inputs, which are connected to the main input power source and the auxiliary input power source, respectively. The dual input power system includes a plurality of power supply units (PSU), such as a PSU1, a PSU2 . . . a PSUn. Input of each power supply unit is connected to the main input power source or the auxiliary input power source, and output of each power supply unit is connected to a load, and the power supply unit can convert an alternating current to a stable direct current to power the load.

A power grid is used as a main input power source, and the auxiliary input power source is a battery. When the power grid fails, the power supply units can be powered through the auxiliary input power source. However, the battery cannot supply power to the power supply units for a long time, thus a standby power source is used as the main input power source to supply power to the power supply units. In this condition, the input of each power supply unit needs to be switched from the auxiliary input power source to the main input power source. There are two methods for switching, and the two switching methods will be briefly described below.

Figure 2:
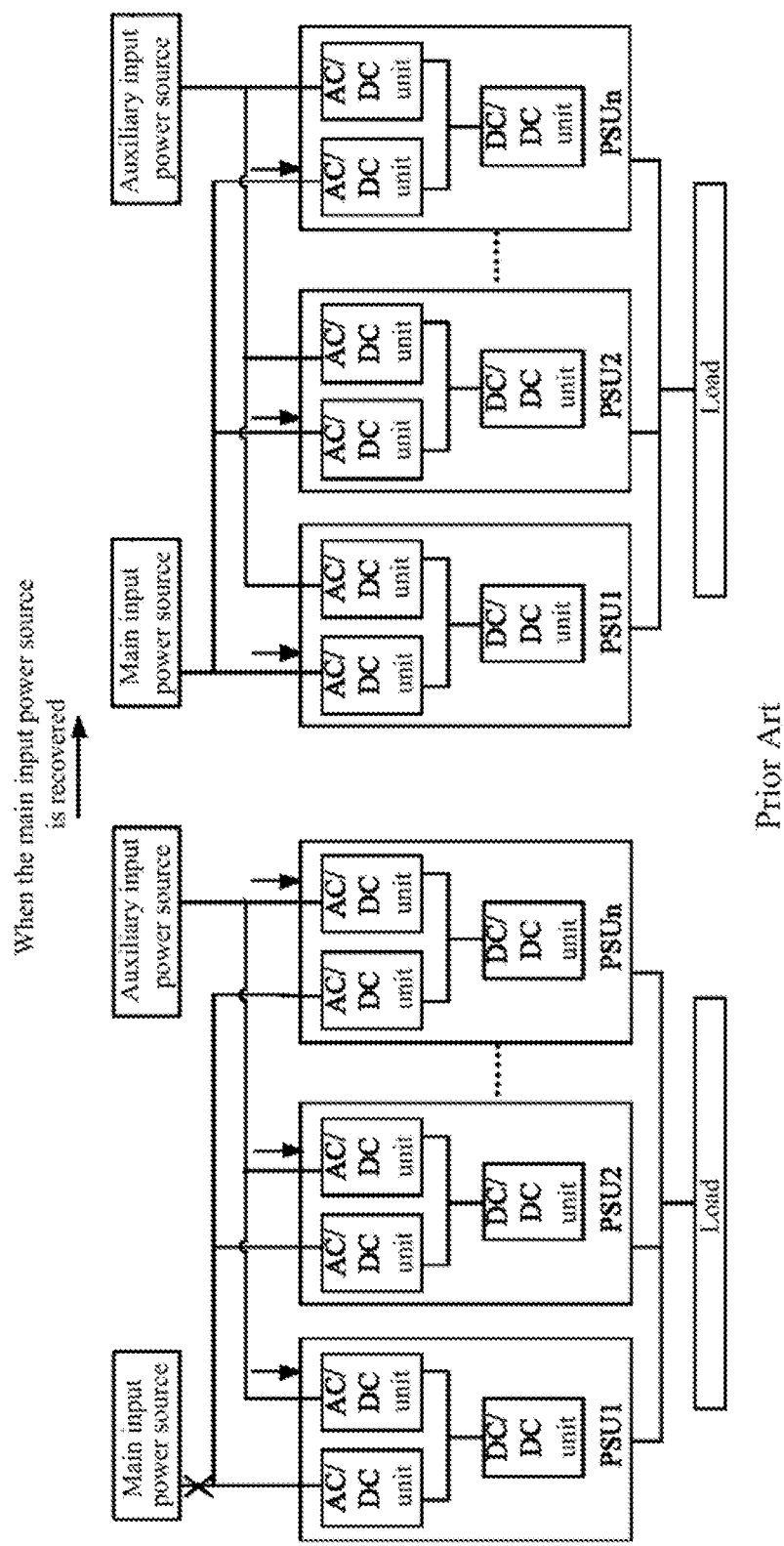
FIG. 2 is a structural principle diagram of a switching method in the prior art.

FIG. 2 is structural principle diagram of a switching method in the prior art. As shown in FIG. 2, each power supply unit includes two AC/DC units, where the main input power source is connected to one AC/DC unit, and the auxiliary input power source is connected to the other AC/DC unit. When the main input power source is active, the main input power source can be controlled by software to supply power to the power supply units, and the auxiliary input power source is in a standby state, that is, the output power of the AC/DC units connected to the auxiliary input power source are controlled to reduce. When the main input power source fails, the auxiliary input power source is controlled by software to supply power to the power supply units. In the above process of power source switching, since there are two AC/DC units, the input power source to which an AC/DC unit connects does not change, and a capacitor between the AC/DC unit and the DC/DC unit is not discharged or charged, thus there will not be an inrush current. However, the method requires two AC/DC units to be set for each power supply unit, thus the cost of the power supply units with the method is high.

Figure 3:
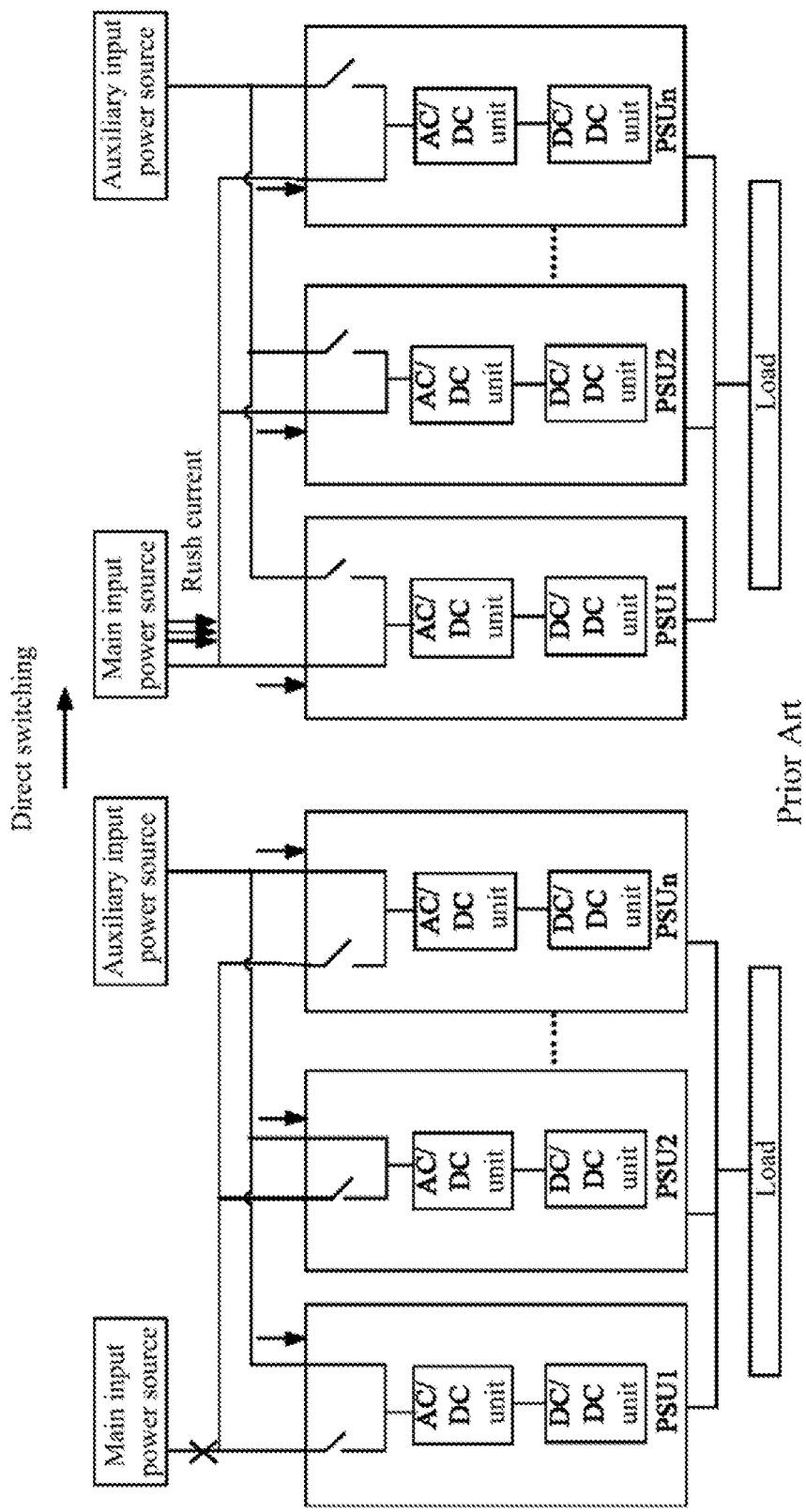
FIG. 3 is a structural principle diagram of another switching method in the prior art.

FIG. 3 is a structural principle of another switching method in the prior art. As shown in FIG. 3, in order to save the cost of the power supply units, the main input power source and the auxiliary input power source share one AC/DC unit. When the main input power source fails, the input of each AC/DC units will be directly connected to the auxiliary input power source. However, in this process, neither the main input power source nor the auxiliary input power source can provide power at the moment of switching, and the capacitor between the AC/DC unit and the DC/DC unit is discharged. When the AC/DC unit is connected to the main input power source, all capacitors that have been discharged need to be charged, and a large inrush current will be generated in the process of charging. Different standby power sources have different sensitivity to the inrush current, and price of a standby power source with a low sensitivity to the inrush current is very high. Therefore, when this switching method is adopted, there's a high requirement for the standby power source as the main input power source, which will also increase the cost of the system.

Based on the above technical defect, we hope that, during power source switching, the inrush current is reduced to reduce the possibility of output failure, under a premise of reducing the system cost. For the second switching method above, the inrush current is generated because all capacitors in the power supply units need to be charged simultaneously. Therefore, in order to avoid generating the inrush current, it can be considered to switch the power supply units from the auxiliary input power source to the main input power source at different moments, and when the time-sharing switching method is adopted, since outputs are established at different moments, the inrush currents will appear gradually, so the reduction of the inrush current is realized, thereby reducing the possibility of output failure.

The following will describe the technical solutions of the present disclosure in detail with reference to the specific embodiments. The following several specific embodiments may be combined with each other, and the same or similar concepts or procedures may not be repeated in some embodiments.

Figure 4:
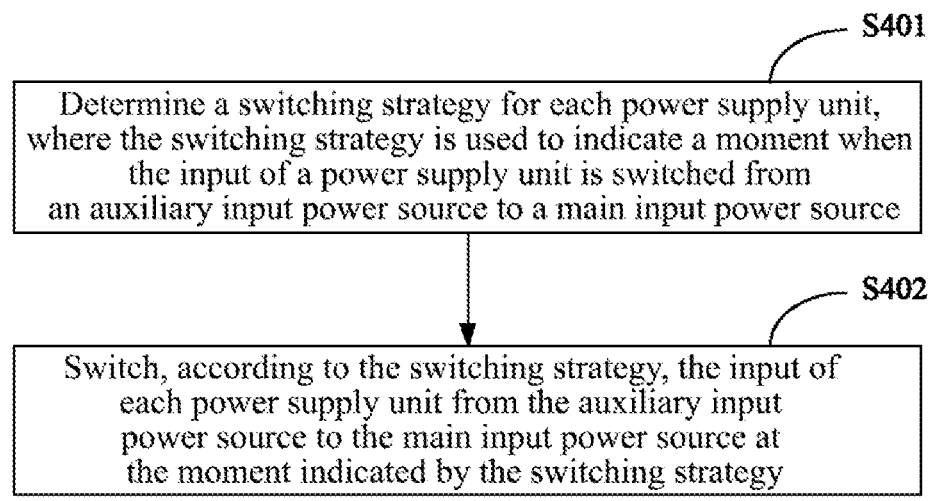
FIG. 4 is a flowchart of a switching method provided by an embodiment of the present disclosure.

FIG. 4 is a flowchart of a switching method provided by an embodiment of the present disclosure. As shown in FIG. 4, the method of the present embodiment may include:

S401, determine a switching strategy for each power supply unit, where the switching strategy is used to indicate a moment when the input of a power supply unit is switched from an auxiliary input power source to a main input power source.

In this embodiment, in order to realize that a plurality of power supply units are switched from the auxiliary input power source to the main input power source at different moments, a switching strategy for each power supply unit can be generated first. The switching strategy refers to a moment when the input of each power supply unit is switched from the auxiliary input power source to the main input power source. Specifically, the moment is used to indicate a switching moment of each power supply unit, or, the moment may further be used to indicate a time interval between a last switching moment and a next switching moment, where one or more power supply units may be switched at the same switching moment.

For each switching, the time interval between the last switching moment and the next switching moment may be different. A number of power supply units to be switched each time may also be different.

S402, switch, according to the switching strategy, the input of each power supply unit from the auxiliary input power source to the main input power source at the moment indicated by the switching strategy.

A standby power source can be used as the main input power source, and N is greater than 1, where N is a number of the power supply units.

In this embodiment, after the switching strategy is determined, that is, after the switching moment of the input of each power supply unit is determined, and when the switching moment arrives, a corresponding power supply unit is switched from the auxiliary input power source to the main input power source. For example, when there are 5 power supply units, the switching moments for the 5 power supply units need to be determined; at moment 1, an input of a power supply unit 1 and an input of a power supply unit 2 are switched from the auxiliary input power source to the main input power source, at moment 2, moment 3 and moment 4, inputs of a power supply unit 3, a power supply unit 4 and a power supply unit 5 are switched from the auxiliary input power source to the main input power source, respectively.

In this embodiment, the main input power source includes a power grid and a standby power source. When the power grid is abnormal or the system itself has a particular condition and cannot use the power grid for power supplying, the standby power source can supply power to the system.

Figure 5:
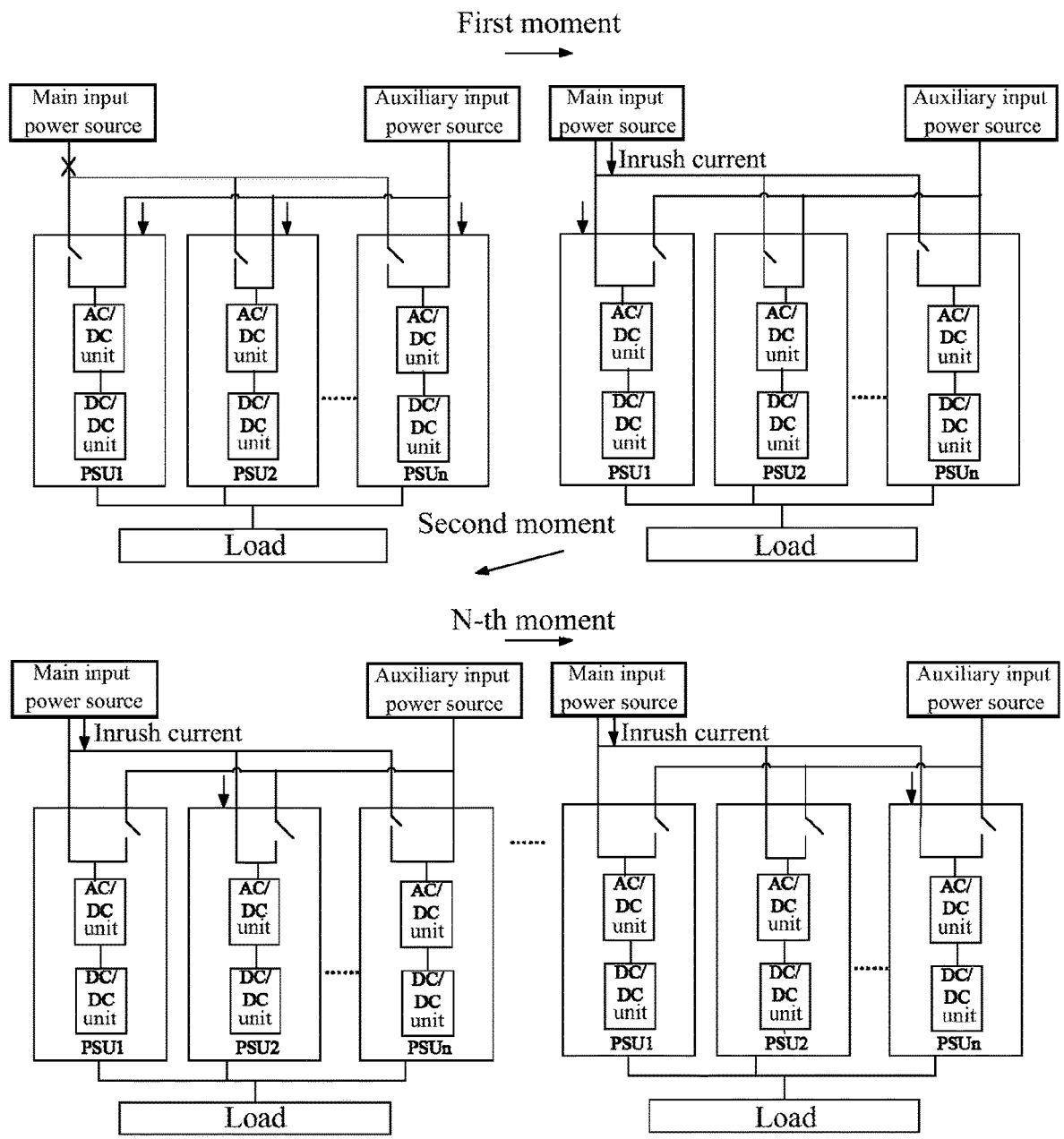
FIG. 5 is a structural principle diagram of a switching method provided by an embodiment of the present disclosure.

FIG. 5 is a structural principle diagram of a switching method provided by an embodiment of the present disclosure. As shown in FIG. 5, a time-sharing switching method of the power supply units is shown. For a system including N power supply units, when the N power supply units need to be switched from the auxiliary input power source to the main input power source, N moments may be determined first, and one power supply unit is switched from the auxiliary input power source to the main input power source at each moment, respectively. At the first moment, a first power supply unit is switched from the auxiliary input power source to the main input power source; at the second moment, a second power supply unit is switched from the auxiliary input power source to the main input power source; and so on, at the N-th moment, an N-th power supply unit is switched from the auxiliary input power source to the main input power source. One power supply unit is switched at each moment, resulting in that the main input power source can supply power for one power supply unit, which greatly reduces the inrush current compared with supplying power for all the N power supply units simultaneously. In addition, the solution of switching all power supply units at the same time will cause a steady-state input current changing from 0 to the maximum abruptly; and the time-sharing solution will make the steady-state input current gradually change from 0 to the maximum according to the time of time-sharing switching, that is, the slope of the steady-state input current can be slowed down and the pressure on the standby power source can be reduced.

In the switching method provided by the embodiments of the present disclosure, a switching strategy corresponding to respective power supply units is determined, where the switching strategy is used to indicate moment when input of each power supply unit switches from an auxiliary input power source to a main input power source. The input of each power supply unit is switched, according to the switching strategy, from the auxiliary input power source to the main input power source at determined moment, where the main input power source includes a standby power source. With the above method, it is realized that when the power supply units are switched from the auxiliary input power source to the main input power source, the inrush current is reduced, and the possibility of output failure is reduced. At the same time, the slope of the steady-state input current can also be slowed down, and the pressure on the standby power source is reduced.

In the following, the switching method of the power supply unit is described in detail with reference to a specific embodiment.

Figure 6:
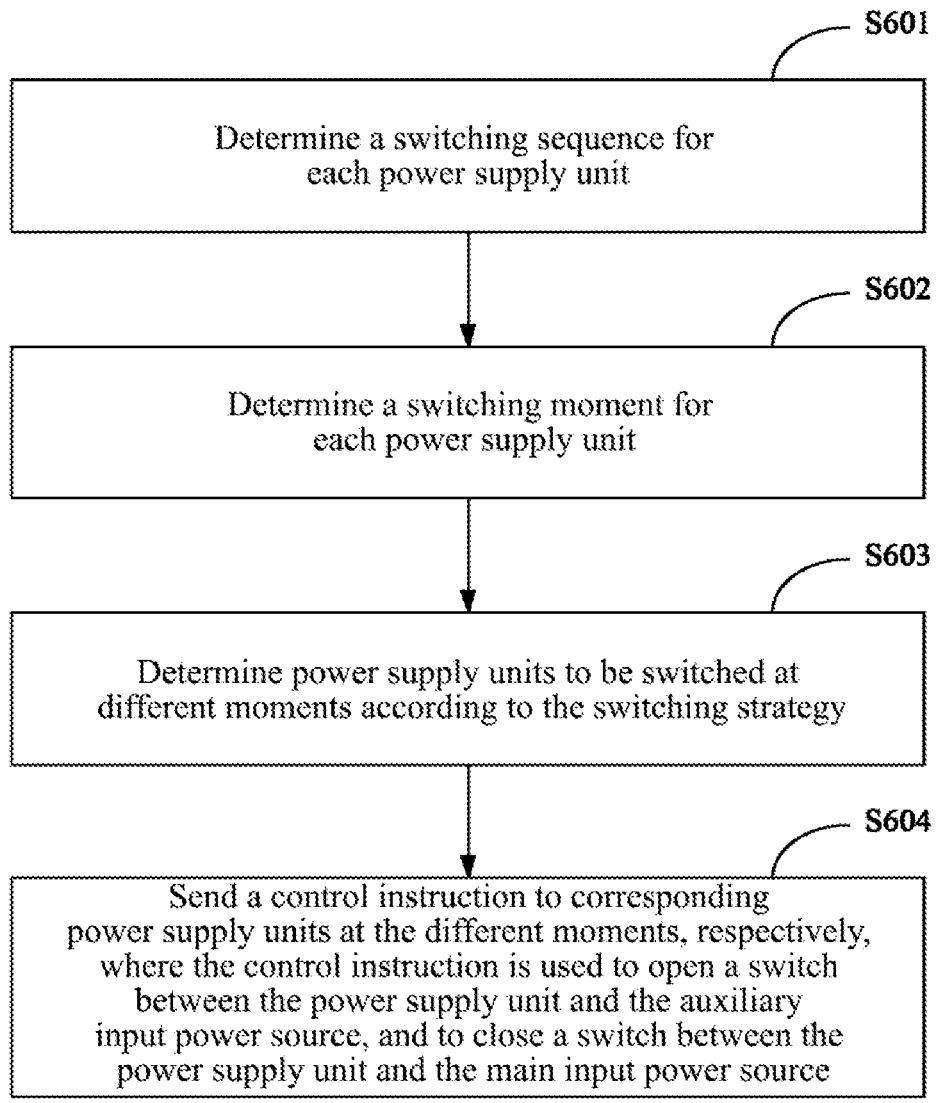
FIG. 6 is a flowchart of another switching method provided by an embodiment of the present disclosure.

FIG. 6 is a flowchart of another switching method provided by an embodiment of the present disclosure, as shown in FIG. 6, on the basis of the above embodiment, the method of the present embodiment may include:

S601, determine a switching sequence for each power supply unit.

In this embodiment, in order to determine a switching strategy of each power supply unit, that is, to determine switching moment of each power supply unit, the switching sequence of the respective power supply units may be determined first. For example, the switching sequence may be obtained according to an arrangement sequence of the power supply units, where the arrangement sequence may be determined as the switching sequence, or, a sequence opposite to the arrangement sequence may be taken as the switching sequence, or, a sequence randomly generated may be taken as the switching sequence. There may be two or more power supply units correspond to the same switching sequence number in the generated arrangement sequence. For example, when there are 5 power supply units, a switching sequence including 5 switching sequence numbers may be generated, where the 5 power supply units are all with different sequence numbers and switched at different time. A switching sequence including 3 sequence numbers may also be generated, where some power supply units are with the same sequence numbers and are switched at the same time.

S602, determine a switching moment for each power supply unit, where a time interval between any two adjacent switching moments is equal to or is greater than a time period required to switch the input of the power supply unit from the auxiliary input power source to the main input power source.

In this embodiment, after determining the switching sequence of the power supply units, switching moments of the power supply units also need to be determined. It takes a certain amount of time for any power supply unit to switch from the auxiliary input power source to the main input power source. Under some circumstances, after a power supply has finished switching, the next one may start switching. Then, a time interval between two adjacent switching moments is exactly equal to or is greater than the time period required to switch the power supply unit, and this method can ensure a small inrush current.

In addition, under some circumstances, if it is needed to implement the switching of all power supply units within a short time, the time interval between any two adjacent switching moments can be set to be smaller than the time period required to switch the input of the power supply unit from the auxiliary input power source to the main input power source. The switching of all power supply units can be finished within a short time by this method.

S603, determine power supply units to be switched at different moments.

In this embodiment, after determining the switching sequence and the switching moments of the respective power supply units, a power supply unit to be switched at a certain moment can be determined. For example, a power supply unit 1 needs to be switched at a first switching moment, a power supply unit 2 needs to be switched at a second switching moment, and a power supply unit 3 and a power supply unit 4 need to be switched at a third switching moment.

S604, send a control instruction to corresponding power supply units at the different moments, respectively, where the control instruction is used to open a switch between the power supply unit and the auxiliary input power source, and to close a switch between the power supply unit and the main input power source.

After determining the power supply units to be switched at different moments, it is judged whether a current moment is the set switching moment, and if it is, the control instruction is sent to a corresponding power supply unit. There are switches arranged between the power supply unit and the main input power source and between the power supply unit and the auxiliary input power source. The control instruction is used to control the power supply unit to switch from the auxiliary input power source to the main input power source. Specifically, the control instruction may control the switch between the power supply unit and the auxiliary input power source to open, and control the switch between the power supply unit and the main input power source to close.

It can be ensured by the above method that each power supply unit is switched from the auxiliary input power to the main input power in a time-sharing way.

Optionally, the method further includes:

detecting whether the main input power source is able to supply power; performing, when it is detected that the main input power source is able to supply power, the step of determining a switching strategy for the power supply units.

In addition, before switching the power supply units, it also needs to be determined whether the main input power source can supply power, and only when the main input power source can supply power, the step of switching the power supply units from the auxiliary input power source to the main input power source can be performed.

When determining whether the main input power source is able to supply power, an output voltage of the main input power source may be detected, and when the obtained output voltage is greater than 0 or is greater than a preset voltage, it is indicated that the main input power source is able to supply power. That the main input power source is able to supply power may refer to that the power grid is changed from a failure state to a non-failure state, or, that the standby power source can supply power.

In addition, it needs to be noted that the step of detecting whether the main input power source is able to supply power can be performed before the switching strategy for the power supply units is determined, or after the switching strategy for the power supply units is determined. That is, it can be first determined that the main input power source is able to supply power, and then the switching strategy for the power supply units is determined; or the switching strategy of the respective power supply units is determined first, and once the main input power source can supply power, the switching action is performed right away.

By judging whether the main input power source is able to supply power, it can be ensured that the respective power supply units are switched to the main input power source successfully.

Optionally, the standby power source is a diesel generator.

In this embodiment, the standby power source may be a diesel generator, and the diesel generator is sensitive to a change of a load, thus the number of the power supply units switched to the main input power source at the same time needs to be limited.

By limiting the number of power supply units switched to the main input power source at the same time, the normal operation of the standby power source can be ensured, thereby avoiding a system breakdown.

In the following, another switching method is described in detail with reference to a specific embodiment.

When switching the inputs of the power supply units according to the method of the above embodiment, other operations may also be performed, to improve the beneficial effects of the time-sharing switching solution.

Optionally, an output current of the power supply unit is reduced when the input of the power supply unit is switching from the auxiliary input power source to the main input power source.

In this embodiment, when switching the input of the power supply unit from the auxiliary input power source to the main input power source, the output current of the power supply unit can be reduced, and the output voltage of the power supply unit can be reduced by the method of software control, thereby implementing the reduction of the output current. Or, the output current of the power supply unit can be reduced before the input of the power supply unit is switched from the auxiliary input power source to the main input power source. Here, before switching to the main input power source, refers to a moment after the switching of a last power supply unit is completed and before this power supply unit is switched.

For example, when switching the power supply unit 1 from the auxiliary input power source to the main input power source, the output current of the power supply unit 1 can be reduced.

By reducing the output current of the power supply unit, a holdup time of the power supply unit can be improved. Since the output current is reduced and a voltage of a capacitor in the power supply unit is unchanged, the output power is reduced, and thus the holdup time is increased.

In addition, by reducing the output current of the power supply unit, the inrush current can be further reduced. Since at the moment when the power supply unit is switched, both the auxiliary input power source and the main input power source cannot supply power to the power supply unit, the capacitor in the power supply unit needs to supply power. When the output current is reduced, the voltage of the capacitor in the power supply unit decreases less, and after the power supply unit is switched to the main input power source and the capacitor needs to be charged, the generated inrush current will also be reduced.

In addition, by reducing the output current of the power supply unit, a switching pressure on a dual-power source automatic transfer switch (ATS) can also be reduced. The switching time of an ATS depends on the holdup time of the power supply unit, and the ATS only needs to be switched within the holdup time. When the holdup time increases, the switching time for the ATS increases correspondingly, making the switching pressure on the ATS decrease.

In addition, reducing the output current of the power supply unit, can make the system have a preset redundancy effect for a long time. For example, for an N+1 redundancy system, there is one power supply unit as a standby power supply unit. When there is one power supply unit cannot operate normally among N power supply units, the redundancy of the system is reduced to N+0. When the holdup time of the power supply unit increases, the redundancy of the system will be kept to N+1. This is because when the holdup time is short, the power supply unit will be caused to lose power, and need to restart. For example, when switching a power supply unit from the auxiliary input power source to the main input power source, if the main input power source fails again in the switching process, the power supply unit needs to be switched to the auxiliary input power source again, thus the switching time of the process will increase, and the holdup time generally cannot satisfy the switching time under the above extreme circumstance. On the contrary, when the holdup time is relatively long, the power supply unit will not lose power, and the redundancy can be kept to N+1.

By reducing the output current of the power supply unit on the basis of the time-sharing switching of the power supply units, the holdup time of the power supply unit can be improved, thereby further reducing the inrush current, reducing the switching pressure on the ATS switch of the power supply unit, and improving the redundancy effect of the system.

Optionally, when switching the input of the power supply unit from the auxiliary input power source to the main input power source, a voltage of the capacitor corresponding to the power supply unit is improved.

The power supply unit includes an AC/DC unit and a DC/DC unit, and the AC/DC unit and the DC/DC unit are connected through a capacitor.

In this embodiment, the voltage of the capacitor of the power supply unit can be increased by the method of software control. For example, when the power supply unit 1 needs to be switched from the auxiliary input power source to the main input power source, the voltage of the capacitor of the power supply unit 1 can be increased. The increase of the holdup time of the power supply unit is implemented by increasing the voltage of the capacitor of the power supply unit. The effects of increasing the voltage of the capacitor and reducing the output current of the power supply unit to be switched are the same, and when the voltage of the capacitor is increased, the holdup time of the power supply unit can be prolonged.

Or, the voltage of the capacitor of the power supply unit can be increased before the input of the power supply unit is switched from the auxiliary input power source to the main input power source. Here, before switching to the main input power source refers to a moment after the switching of a last power supply unit is completed and before this power supply unit is switched.

Similarly, increasing the voltage of the capacitor of the power supply unit can achieve a same beneficial effect as that of reducing the output current of the power supply mentioned above, that is, it can further reduce the inrush current, reduce the switching pressure on the ATS switch of the corresponding power supply unit, and improve the redundancy effect of the system.

The above is only illustrated by a dual-input power source system, and all control methods are also applicable to systems with more than two input power sources.

In the following, a power switching method of a multi-input power system will be described in detail through another embodiment.

The method is used in a multi-input power system, the multi-input power system including: a first power supply unit, a second power supply unit, a main input power source and an auxiliary input power source; the first power supply unit is electrically coupled with the main input power source through a first switch, and is electrically coupled with the auxiliary input power source through a second switch;

the second power supply unit is electrically coupled with the main input power source through a third switch, and is electrically coupled with the auxiliary input power source through a fourth switch;

the switching method includes:

switching, when the first power supply unit and the second power supply unit need to be switched from the auxiliary input power source to the main input power source, the first power supply unit and the second power supply unit from the auxiliary input power source to the main input power source at different moments, respectively, where the main input power source includes a standby power source.

In this embodiment, the multi-input power system includes a first power supply unit and a second power supply unit. The first power supply unit and the second power supply unit are connected to the main input power source and the auxiliary input power source through different switches. When the input power source of the first power supply unit and the second power supply unit needs to be switched, the first power supply unit and the second power supply unit are switched from the auxiliary input power source to the main input power source at different moments, respectively.

Optionally, the switching the first power supply unit and the second power supply unit from the auxiliary input power source to the main input power source at different moments, respectively, includes:

switching, after the first power supply unit is switched from the auxiliary input power source to the main input power source, the second power supply unit from the auxiliary input power source to the main input power source.

The switching method for the multi-input power system provided by this embodiment also has a limitation that the time interval between any two adjacent switching moments is equal to or is greater than the time required to switch the input of the power supply unit from the auxiliary input power source to the main input power source, which is the same as that in the above embodiment, and will not be repeated here.

Optionally, the method further includes:

reducing, when the first power supply unit starts to switch from the auxiliary input power source to the main input power source, an output current of the first power supply unit, or reducing, when the second power supply unit starts to switch from the auxiliary input power source to the main input power source, an output current of the second power supply unit second power supply unit.

The method of reducing the output current of the first power supply unit or the second power supply unit provided by this embodiment is the same as the process of reducing the output current of the power supply unit as described in the above embodiment, which will not be repeated herein.

Optionally, the power supply unit includes an AC/DC unit and a DC/DC unit, and the AC/DC unit and the DC/DC unit are connected through a capacitor, and the method further includes:

raising, when the first power supply unit starts to switch from the auxiliary input power source to the main input power source is started, a voltage of the capacitor of the first power supply unit or the second power supply unit; or raising, when the second power supply unit starts to switch from the auxiliary input power source to the main input power source, a voltage of the capacitor of the second power supply unit.

The method of raising the voltage of the capacitor of the first power supply unit or the second power supply unit provided by this embodiment is the same as the process of improving the voltage of the capacitor of the power supply unit as described in the above embodiment, which will not be described herein.

Optionally, the switching the first power supply unit and the second power supply unit from the auxiliary input power source to the main input power source at different moments, respectively, includes:

when the first power supply unit is switched from the auxiliary input power source to the main input power source, opening the second switch, and closing the first switch; when the second power supply unit is switched from the auxiliary input power source to the main input power source, opening the fourth switch, and closing the third switch.

The method of opening and closing switches provided by this embodiment is the same as the content of executing the control instruction of the power supply unit, which will not be repeated herein.

Optionally, the method further includes:

detecting whether the main input power source is able to supply power, and when it is detected that the main input power source is able to supply power, performing switching the first power supply unit and the second power supply unit from the auxiliary input power source to the main input power source at different moments respectively.

The process of detecting whether the main input power source is able to supply power in this embodiment is the same as the process of detecting whether the main input power source is able to supply power described in the above embodiment, which will not be repeated herein.

Optionally, the standby power source is a diesel generator.

The restriction on the number of the power supply units switched to the main input power source at the same time provided by this embodiment is the same as the restriction on the number of the power supply units switched to the main input power source at the same time in the above embodiment, which will not be repeated here.

Figure 7:
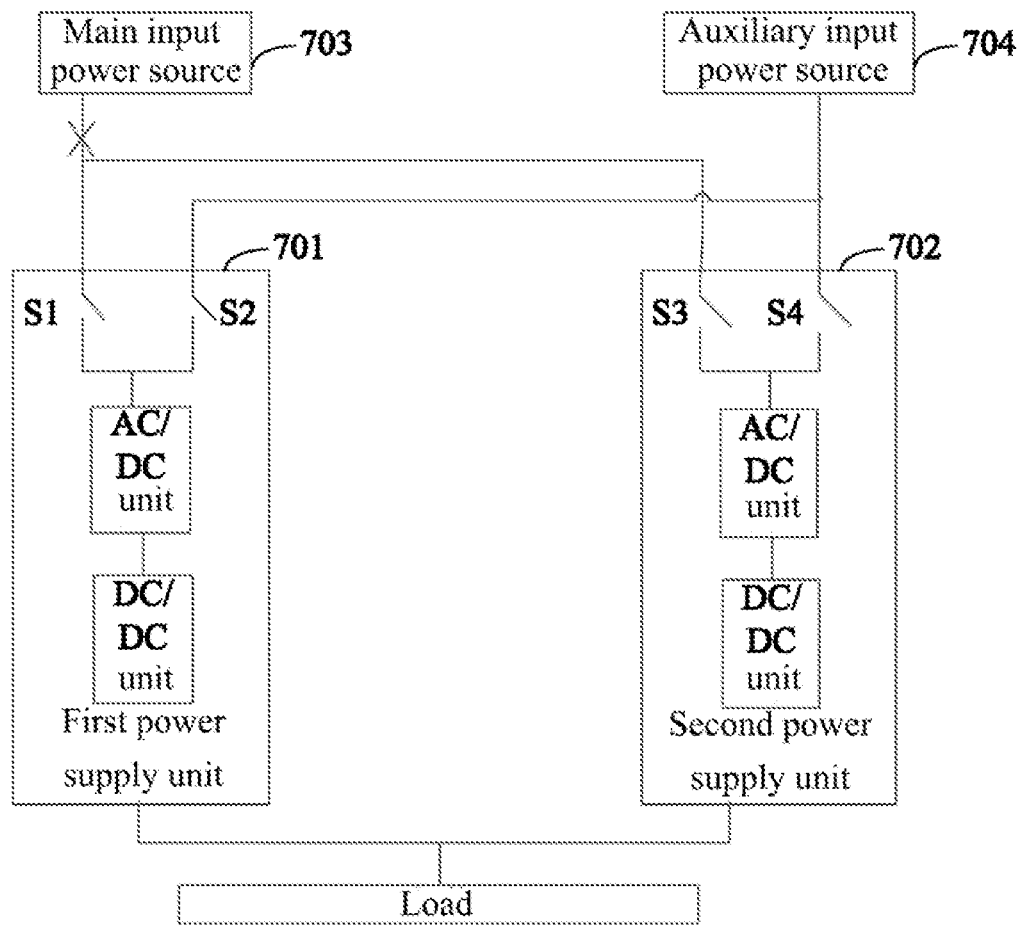
FIG. 7 is a structural diagram of a multi-input power system provided by an embodiment of the present disclosure.

FIG. 7 is a structural diagram of a multi-input power system provided by an embodiment of the present disclosure, the system including: a first power supply unit 701, a second power supply unit 702, a main input power source 703 and an auxiliary input power source 704;

the first power supply unit 701 is electrically coupled with the main input power source 703 through a first switch S1, and is electrically coupled with the auxiliary input power source 704 through a second switch S2, where the main input power source 704 includes a standby power source;

the second power supply unit 702 is electrically coupled with the main input power source 703 through a third switch S3, and is electrically coupled with the auxiliary input power source 704 through a fourth switch S4;

when the first power supply unit 701 and the second power supply unit 702 need to be switched from the auxiliary input power source 704 to the main input power source 703, the first power supply unit 701 and the second power supply unit 702 are switched from the auxiliary input power source 704 to the main input power source 703 at different moments, respectively.

Optionally, after the first power supply unit 701 is switched from the auxiliary input power source 704 to the main input power source 703, the second power supply unit 702 is switched from the auxiliary input power source 704 to the main input power source 703.

Optionally, in a process of switching the first power supply unit 701 from the auxiliary input power source 704 to the main input power source 703, an output current of the first power supply unit 701 is controlled to reduce; and, in a process of switching the second power supply unit 702 from the auxiliary input power source 704 to the main input power source 703, an output current of the second power supply unit 702 is controlled to reduce.

Optionally, the power supply unit includes an AC/DC unit and a DC/DC unit, and the AC/DC unit and the DC/DC unit are connected through a capacitor;

when the first power supply unit 701 is switched from the auxiliary input power source 704 to the main input power source 703, a voltage of a capacitor of the first power supply unit 701 is controlled to increase; and, when the second power supply unit 702 is switched from the auxiliary input power source 704 to the main input power source 703, a voltage of a capacitor of the second power supply unit 702 is controlled to increase.

Optionally, when the first power supply unit 701 is switched from the auxiliary input power source 704 to the main input power source 703, the second switch is opened, and the first switch is closed; and, when the second power supply unit 702 is switched from the auxiliary input power source 704 to the main input power source 703, the fourth switch is opened, and the third switch is closed.

Optionally, the system further includes a detecting module;

the detecting module is configured to detect whether the main input power source 703 is able to supply power, and when it is detected that the main input power source 703 is able to supply power, the first power supply unit 701 and the second power supply unit 702 are switched from the auxiliary input power source 704 to the main input power source 703 at different moments, respectively.

Optionally, the standby power source is a diesel generator.

In the above system, the process of controlling the power source switching, and/or, the process of controlling the voltage of the capacitor the power supply unit to increase, and/or, the process of controlling the output current of the power supply unit to reduce can be implemented by a control module.

The above multi-input power system is a system corresponding to the switching method of a multi-input power system in the above embodiment, which can be used to perform the technical solutions in the above method embodiments, and the implementation principle and the technical effect thereof are similar, which will not be repeated herein.

Finally, it should be noted that: the above embodiments are only used to illustrate the technical solutions of the present disclosure, but not to limit it; although the disclosure has been described in detail with reference to the above embodiments, those of ordinary skills in the art should understand that the technical solutions described in the above embodiments can still be modified, or some or all of the technical features can be equivalently replaced; however, these modifications or substitutions do not make the essence of the corresponding technical solutions deviate from the scope of the technical solutions of the embodiments of this disclosure.

What is claimed is:

1. A switching method for switching N power supply units, where N is greater than 1, the method comprising:
   determining a switching strategy for each power supply unit, wherein the switching strategy is used to indicate a moment when input of a power supply unit is switched from an auxiliary input power source to a main input power source; and
   switching, according to the switching strategy, the input of each power supply unit from the auxiliary input power source to the main input power source at the moment indicated by the switching strategy,
   wherein the main input power source comprises a standby power source;
   wherein the method further comprises:
   reducing an output current of the power supply unit when the input of the power supply unit is switching from the auxiliary input power source to the main input power source; or
   reducing the output current of the power supply unit before the input of each power supply unit starts to switch from the auxiliary input power source to the main input power source.

2. The method according to claim 1, wherein switching, according to the switching strategy, the input of each power supply unit from the auxiliary input power source to the main input power source at the moment indicated by the switching strategy comprises:
   determining power supply units to be switched at different moments;
   sending a control instruction to corresponding power supply units at the different moments, respectively, wherein the control instruction is used to open a switch between the power supply unit and the auxiliary input power source, and to close a switch between the power supply unit and the main input power source.

3. The method according to claim 1, wherein determining a switching strategy for each power supply unit comprises:
   determining a switching sequence for each power supply unit;
   determining a switching moment for each power supply unit, wherein a time interval between any two adjacent switching moments is equal to or is greater than a time period required to switch the input of the power supply unit from the auxiliary input power source to the main input power source.

4. The method according to claim 1, wherein the power supply unit comprises an AC/DC unit and a DC/DC unit, and the AC/DC unit and the DC/DC unit are connected through a capacitor, and the method further comprises:
   raising, when switching the input of the power supply unit from the auxiliary input power source to the main input power source, a voltage of the capacitor corresponding to the power supply unit.

5. The method according to claim 1, wherein the method further comprises:
   detecting whether the main input power source is able to supply power; and
   performing, when it is detected that the main input power source is able to supply power, the step of determining the switching strategy for each power supply unit.

6. The method according to claim 1, wherein the standby power source is a diesel generator.

7. A switching method applied to a multi-input power system,
   wherein the multi-input power system comprises a first power supply unit, a second power supply unit, a main input power source and an auxiliary input power source;
   the first power supply unit is electrically coupled with the main input power source through a first switch, and is electrically coupled with the auxiliary input power source through a second switch; and
   the second power supply unit is electrically coupled with the main input power source through a third switch, and is electrically coupled with the auxiliary input power source through a fourth switch,
   the switching method comprising:
   switching, when the first power supply unit and the second power supply unit need to be switched from the auxiliary input power source to the main input power source, the first power supply unit and the second power supply unit from the auxiliary input power source to the main input power source at different moments, respectively, wherein the main input power source comprises a standby power source;
   wherein the method further comprises:
   reducing an output current of the first power supply unit, when the first power supply unit is switching from the auxiliary input power source to the main input power source; or
   reducing the output current of the first power supply unit, before the first power supply unit starts to switch from the auxiliary input power source to the main input power source.

8. The method according to claim 7, wherein switching the first power supply unit and the second power supply unit from the auxiliary input power source to the main input power source at different moments, respectively, comprises:
   switching, after the first power supply unit is switched from the auxiliary input power source to the main input power source, the second power supply unit from the auxiliary input power source to the main input power source.

9. The method according to claim 7, wherein each of the first power supply unit and the second power supply unit comprises an AC/DC unit and a DC/DC unit, and the AC/DC unit and the DC/DC unit are connected through a capacitor, and the method further comprises at least one of:
   raising, when the first power supply unit starts to switch from the auxiliary input power source to the main input power source, a voltage of the capacitor of the first power supply unit; and
   raising, when the second power supply unit starts to switch from the auxiliary input power source to the main input power source, a voltage of the capacitor of the second power supply unit.

10. The method according to claim 7, wherein switching the first power supply unit and the second power supply unit from the auxiliary input power source to the main input power source at different moments, respectively, comprises:
    when the first power supply unit is switched from the auxiliary input power source to the main input power source, opening the second switch, and closing the first switch; when the second power supply unit is switched from the auxiliary input power source to the main input power source, opening the fourth switch, and closing the third switch.

11. The method according to claim 7, wherein the method further comprises:
   detecting whether the main input power source is able to supply power;
   performing, when it is detected that the main input power source is able to supply power, switching the first power supply unit and the second power supply unit from the auxiliary input power source to the main input power source at different moments.

12. The method according to claim 7, wherein the standby power source is a diesel generator.

13. A multi-input power system, wherein the system comprises a first power supply unit, a second power supply unit, a main input power source and an auxiliary input power source;
   the first power supply unit is electrically coupled with the main input power source through a first switch, and is electrically coupled with the auxiliary input power source through a second switch, wherein the main input power source comprises a standby power source;
   the second power supply unit is electrically coupled with the main input power source through a third switch, and is electrically coupled with the auxiliary input power source through a fourth switch;
   when the first power supply unit and the second power supply unit need to be switched from the auxiliary input power source to the main input power source, the first power supply unit and the second power supply unit are switched from the auxiliary input power source to the main input power source at different moments, respectively; and
   wherein when the first power supply unit is switching from the auxiliary input power source to the main input power source, an output current of the first power supply unit is controlled to reduce; or
   before the first power supply unit starts to switch from the auxiliary input power source to the main input power source, the output current of the first power supply unit is controlled to reduce.

14. The multi-input power system according to claim 13, wherein after the first power supply unit is switched from the auxiliary input power source to the main input power source, the second power supply unit is switched from the auxiliary input power source to the main input power source.

15. The multi-input power system according to claim 13, wherein each of the first power supply unit and the second power supply unit comprises an AC/DC unit and a DC/DC unit, and the AC/DC unit and the DC/DC unit are connected through a capacitor;
   when the first power supply unit is switched from the auxiliary input power source to the main input power source, a voltage of the capacitor of the first power supply unit is controlled to increase; and/or,
   when the second power supply unit is switched from the auxiliary input power source to the main input power source, a voltage of the capacitor of the second power supply unit is controlled to increase.

16. The multi-input power system according to claim 13, wherein when the first power supply unit is switched from the auxiliary input power source to the main input power source, the second switch is opened, and the first switch is closed; and, when the second power supply unit is switched from the auxiliary input power source to the main input power source, the fourth switch is opened, and the third switch is closed.

17. The multi-input power system according to claim 13, wherein the system further comprises a detecting module;
   the detecting module is configured to detect whether the main input power source is able to supply power, and when it is detected that the main input power source is able to supply power, the first power supply unit and the second power supply unit are switched from the auxiliary input power source to the main input power source at different moments, respectively.

18. A switching method applied to a multi-input power system, wherein the multi-input power system comprises a first power supply unit, a second power supply unit, a main input power source and an auxiliary input power source, the first power supply unit comprises an AC/DC unit and a DC/DC unit, and the AC/DC unit and the DC/DC unit are connected through a capacitor;
   the first power supply unit is electrically coupled with the main input power source through a first switch, and is electrically coupled with the auxiliary input power source through a second switch; and
   the second power supply unit is electrically coupled with the main input power source through a third switch, and is electrically coupled with the auxiliary input power source through a fourth switch,
   the switching method comprising:
   switching, the first power supply unit and the second power supply unit from the auxiliary input power source to the main input power source at different moments, respectively, when the first power supply unit and the second power supply unit need to be switched from the auxiliary input power source to the main input power source, wherein the main input power source comprises a standby power source, and
   raising a voltage of the capacitor, before switching the input of the first power supply unit from the auxiliary input power source to the main input power source.

19. A multi-input power system, wherein the system comprises a first power supply unit, a second power supply unit, a main input power source and an auxiliary input power source, the first power supply unit comprises an AC/DC unit and a DC/DC unit, and the AC/DC unit and the DC/DC unit are connected through a capacitor;
   the first power supply unit is electrically coupled with the main input power source through a first switch, and is electrically coupled with the auxiliary input power source through a second switch, wherein the main input power source comprises a standby power source;
   the second power supply unit is electrically coupled with the main input power source through a third switch, and is electrically coupled with the auxiliary input power source through a fourth switch;
   when the first power supply unit and the second power supply unit need to be switched from the auxiliary input power source to the main input power source, the first power supply unit and the second power supply unit are switched from the auxiliary input power source to the main input power source at different moments, respectively; and
   before switching the input of the first power supply unit from the auxiliary input power source to the main input power source, a voltage of the capacitor is raised.

\* \* \* \* \*